United States Patent [19]

Dalton et al.

[11] 4,071,274
[45] Jan. 31, 1978

[54] PIVOTAL AND DETACHABLE TRUCK BODY SYSTEM

[75] Inventors: Thomas B. Dalton, Muskegon; Theodore Wayne Pyatt, Twin Lake; Michael Jay Oosterhouse, Fremont, all of Mich.

[73] Assignee: Westran Corporation, Muskegon, Mich.

[21] Appl. No.: 660,126

[22] Filed: Feb. 23, 1976

[51] Int. Cl.² .............................. B60P 1/34; B60P 1/64
[52] U.S. Cl. .................................. 296/35 A; 214/515; 298/220
[58] Field of Search .................. 296/35 A; 298/22 R, 298/22 D, 22 J, 22 B, 17.7; 214/515, 501; 105/366 R

[56] References Cited

U.S. PATENT DOCUMENTS

| Re. 26,399 | 6/1968 | Watters | 296/35 A |
|---|---|---|---|
| 2,168,298 | 8/1939 | Galanot | 298/17.7 |
| 3,096,894 | 7/1963 | Proler | 214/515 |
| 3,119,503 | 1/1964 | Herpich | 296/35 A X |
| 3,362,552 | 1/1968 | Thiele | 214/515 |
| 3,520,433 | 7/1970 | Blackburn | 214/515 |
| 3,692,353 | 9/1972 | Lynde | 296/35 A |
| 3,924,544 | 12/1975 | Grau | 296/35 A |

*Primary Examiner*—Richard J. Johnson
*Attorney, Agent, or Firm*—Gifford, Chandler, Sheridan & Sprinkle

[57] ABSTRACT

A system for removably and pivotally securing a truck body onto the bed of a truck is provided in which the truck body is automatically locked to the bed of the truck as the truck body is lowered onto the truck bed. The system comprises a plurality of guide members secured to the bottom surface of the truck body and an adapter frame secured to the truck bed which receives and guides the guide members as the truck body is lowered onto the truck bed. A plurality of latch members are pivotally secured to the guide members and automatically lock the truck body onto the adapter frame when the truck body reaches its lowermost position. An actuator is associated with each of the latch members so that actuation of the actuators unlocks the latch members and permits the removal of the truck body from the truck bed.

Preferably, the truck body is also pivotally mounted to the adapter frame and for this purpose a pair of spaced and parallel downwardly extending hooks are pivotally secured to the bottom surface of the truck body. The hooks rotatably couple around a hinge tube attached transversely across the rear end of the adapter frame while a semi-cylindrical bearing member on the truck body abuts against the hinge tube as the truck body is lowered to its lowermost position. Thus by unlocking the latch members, as previously described, the truck body may be pivoted around the hinge tube by way of the hooks and the bearing member. An actuator is associated with each hook to move the hook to an inoperative position when removal of the truck body from the truck bed is desired.

13 Claims, 12 Drawing Figures

PIVOTAL AND DETACHABLE TRUCK BODY SYSTEM

BACKGROUND OF THE INVENTION

I. Field of the Invention

The present invention relates generally to truck cargo systems, and more particularly to a system for detachably and pivotally securing a truck body to the bed of a truck.

II. Description of the Prior Art

There have been several previously known truck systems in which the truck body is detachably mounted to the bed of the truck. In addition, some of these previously known systems include means for pivoting the truck body on the truck bed so that the truck body may be used as a dump truck.

In these previously known systems in which the truck body is not only detachable but also pivotally mounted to the truck bed, typically the truck body is secured to a frame interposed between the truck body and the truck bed. Hydraulic means are then utilized to pivot the frame, and consequently, the truck body secured to the frame.

These previously known systems, while adequate in operation, are undesirable in view of their complexity and cost. This disadvantage is due primarily to the previous practice that the frame, rather than the truck body, be pivotally mounted to the truck bed. Such an arrangement, for example, requires a plurality of hydraulic lines, mechanical actuators, and the like extending between the truck bed and the pivotally mounted frame.

A still further disadvantage of these previously known truck systems, is that the means for securing the truck body onto the truck bed or frame often times proved inadequate in operation. Thus when such trucks encountered a bump or the like on the road, the truck bodies tended to lift up above the truck bed. In some instances, the truck body has entirely separated from the truck bed thus not only damaging the cargo, but also creating a serious safety hazard for both the truck driver and also fellow drivers on the road.

SUMMARY OF THE PRESENT INVENTION

The present invention overcomes the above named disadvantages of the previously known truck systems by providing a system for detachably and pivotally securing a truck body onto the bed of a truck as the truck body is lowered onto the truck. As will become hereinafter apparent, the system of the present invention is not only simple and relatively inexpensive in construction, but also provides a means for automatically locking the truck body onto the truck bed to thereby prevent unintended separation of the truck body from the truck bed.

In brief, the system of the present invention comprises a plurality of guide members secured to the bottom surface of the truck body and an adapter frame secured to the bed of the truck and having means adapted to receive and guide the guide members on the truck body as the truck body is lowered onto the truck bed.

A latch member is pivotally mounted to each guide member and functions to automatically engage and lock onto a latch bar in the adapter frame as the truck body reaches its lowermost position. An actuator is mounted onto the adapter frame and is operatively associated with each latch member so that upon actuation, the actuators unlock the latch members from the adapter frame.

A semi-cylindrical bearing member having a pivotally mounted hook at each end is laterally secured along the bottom surface of the truck body. The bearing member abuts against and the hook members automatically engage and rotatably couple around a hinge tube mounted transversely across the rear end of the adapter frame as the truck is lowered to its lowermost position. Thus with the latch members unlocked, the truck body may be pivotally tilted around the hinge tube on the adapter frame by means of the bearing member and hook members. Actuator means are also included to move the hook members into an inoperable position when detachment of the truck body from the truck bed is desired.

In this manner, the truck system of the present invention provides a simple and relatively inexpensive means of detachably and pivotally mounting a truck body to a truck bed. In particular, the latch members provide a means for securely locking the truck body to the adapter frame to prevent unintended separation of the truck body from the truck bed. Moreover, the pivotal connection between the truck body and the hinge tube provides a simple means for pivotally mounting the truck body onto the adapter frame and eliminating the previously known requirement that the adapter frame be pivotally mounted to the truck bed.

BRIEF DESCRIPTION OF THE DRAWINGS

A better understanding of the truck system of the present invention will be had upon reference to the following detailed description when read in conjunction with the accompanying drawing, wherein like reference characters refer to like parts throughout the several views, and in which.

DETAILED DESCRIPTION OF THE PRESENT INVENTION

Figure 1:
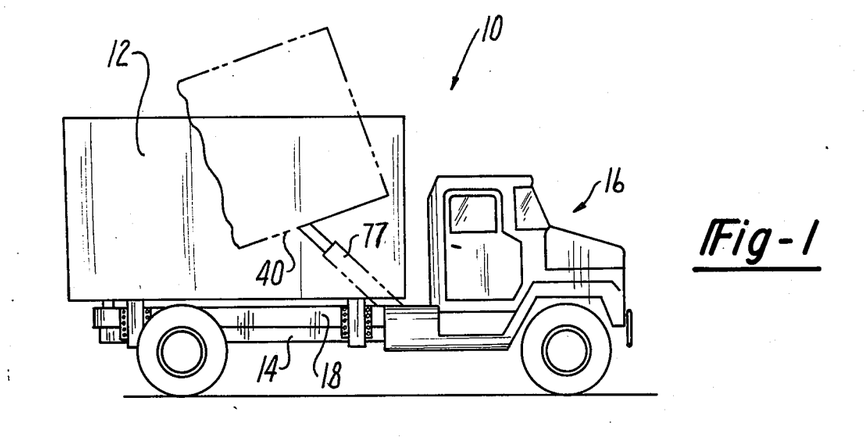
FIG. 1 is a side plan view showing the truck system of the present invention.
Figure 2:
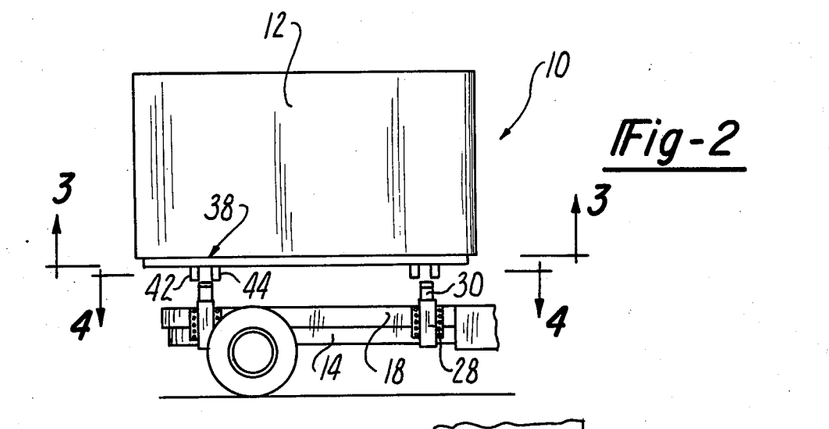
FIG. 2 is a side plan view showing a truck body being lowered onto a truck bed utilizing the system of the present invention.

Referring first to FIGS. 1 and 2, the system 10 of the present invention is thereshown for detachably and pivotally securing a truck body 12 onto the bed 14 of a truck 16 as the truck body 12 is lowered onto the truck bed 14. As will hereinafter be described in greater detail, latch members automatically lock the truck body 12 onto the truck bed 14 when the truck body 12 is lowered to its lowermost position. Likewise, a pivotal connection between the truck body 12 and the truck bed 14 is automatically made as the truck is lowered to its lowermost position.

Figure 4:
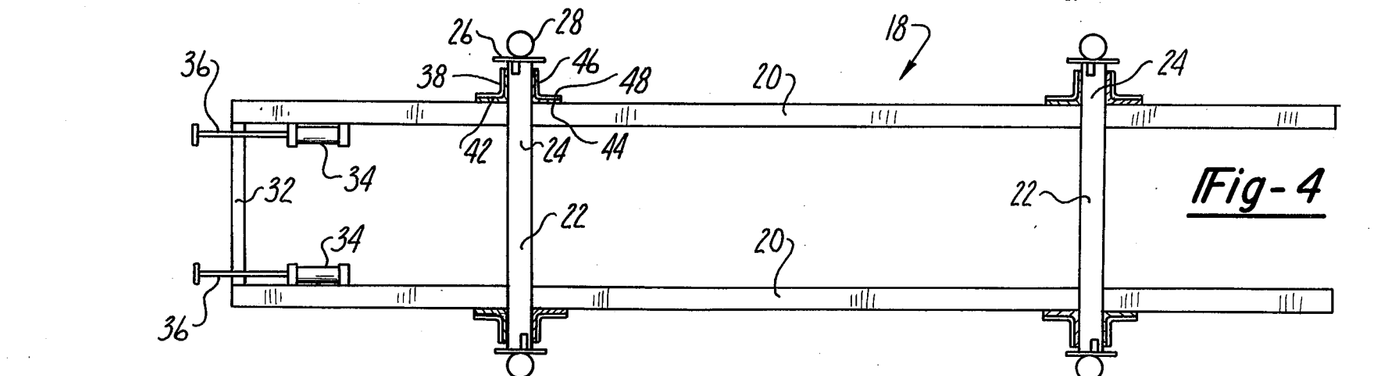
FIG. 4 is a top plan view showing the adapter frame for the system of the present invention and taken substantially along line 4—4 in FIG. 2.
Figure 5:
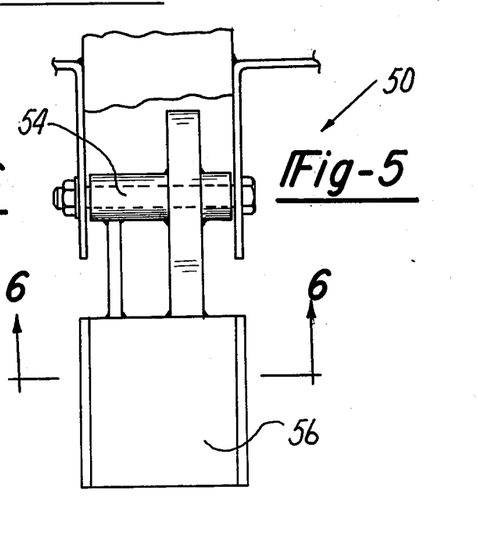
FIG. 5 is an enlargement of circle 5—5 in FIG. 3.
Figure 6:
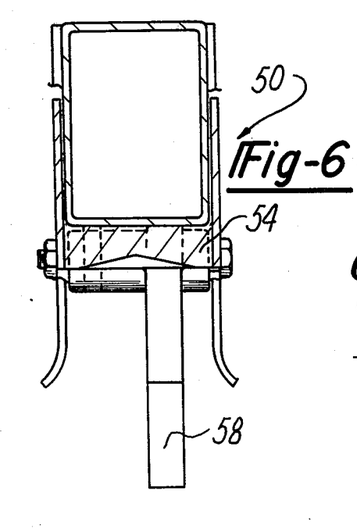
FIG. 6 is a partial cross-sectional view taken substantially along line 6—6 in FIG. 5.
Figure 7:
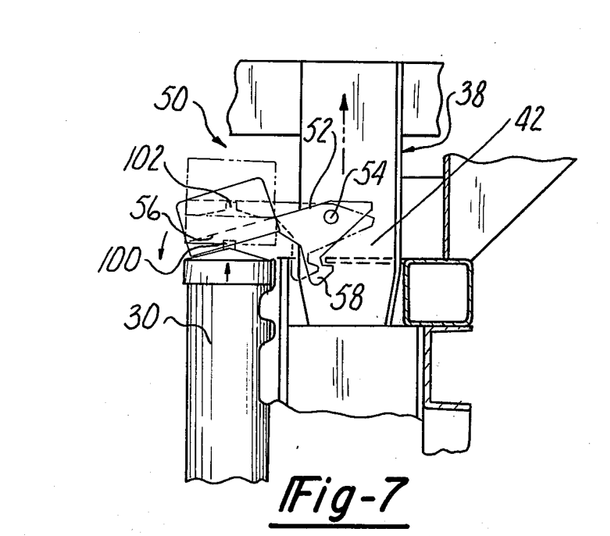
FIG. 7 is a side plan view showing the operation of the latch members for the system of the present invention.
Figure 8:
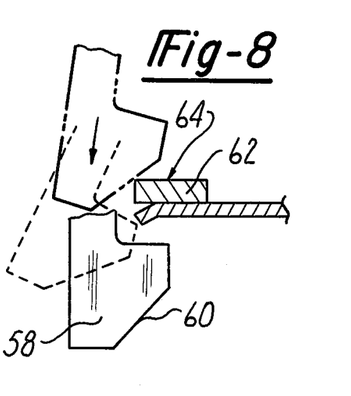
FIG. 8 is a side plan view of the latch members of the present invention similar to FIG. 7 but with parts removed and enlarged for clarity.
Figure 9:
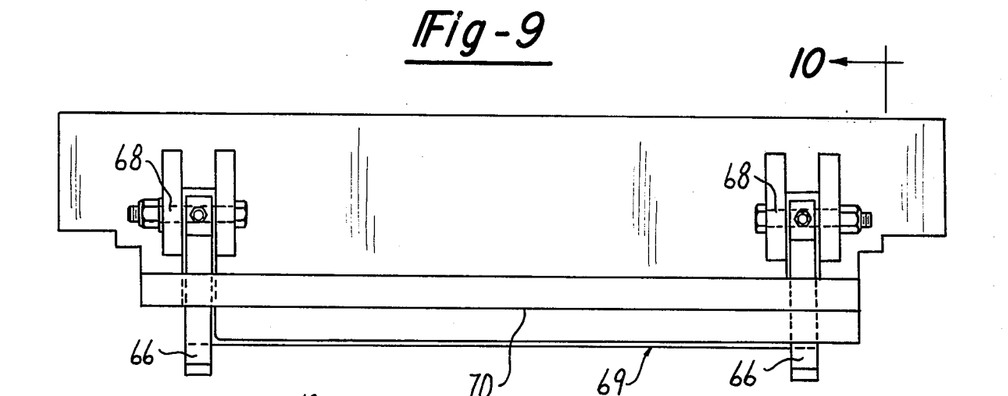
FIG. 9 is a plan view showing the hook members of the present invention and taken substantially along line 9—9 in FIG. 3.

An adapter frame 18, best shown in FIGS. 1, 2, and 4, is secured onto the upper surface of the truck bed 14 by any appropriate means such as by welding, riveting, or the like. The adapter frame 18 comprises a pair of spaced and parallel elongated frame members 20 which run longitudinally along the truck bed 14. A pair of spaced and parallel cross members 22 perpendicularly intersect and are secured to the frame members 20 so that one cross member 22 extends transversely across the front half of the truck bed 14 while the other cross member 22 extends transversely across the rear half of the truck bed 14. In addition, each end of both of the cross members 22 extends beyond the longitudinal members 20 so that a stub portion 24 of the cross members 22 protrudes laterally outward from both of the longitudinal members 20. A vertically disposed plate 22 is secured across each axial end of the cross members 22 and each plate 26 in turn supports an actuator 28 having a piston 30. The actuators 28 may be either hydraulically or mechanically actuated so that, upon actuation, the pistons 30 move vertically upward. The actuation of the actuator 28 is utilized to unlock the truck body 12 from the adapter frame 18 in a manner to be hereinafter described in greater detail.

Still referring to FIG. 4, a cylindrical hinge or rod 32 is laterally disposed across the rear end of the adapter frame 18 and is secured thereto in any conventional manner. The hinge tube 32 forms the pivotal axis of the truck body 12 during a dumping operation as will also be later described. In addition, second actuators 34 with pistons 36 are secured to the longitudinal frame members 20 adjacent the hinge tube 32 and like the first actuators 28 function to unlock the truck body 12 from the adapter frame 18 to permit removal of the truck body 12 from the truck 16.

Figure 3:
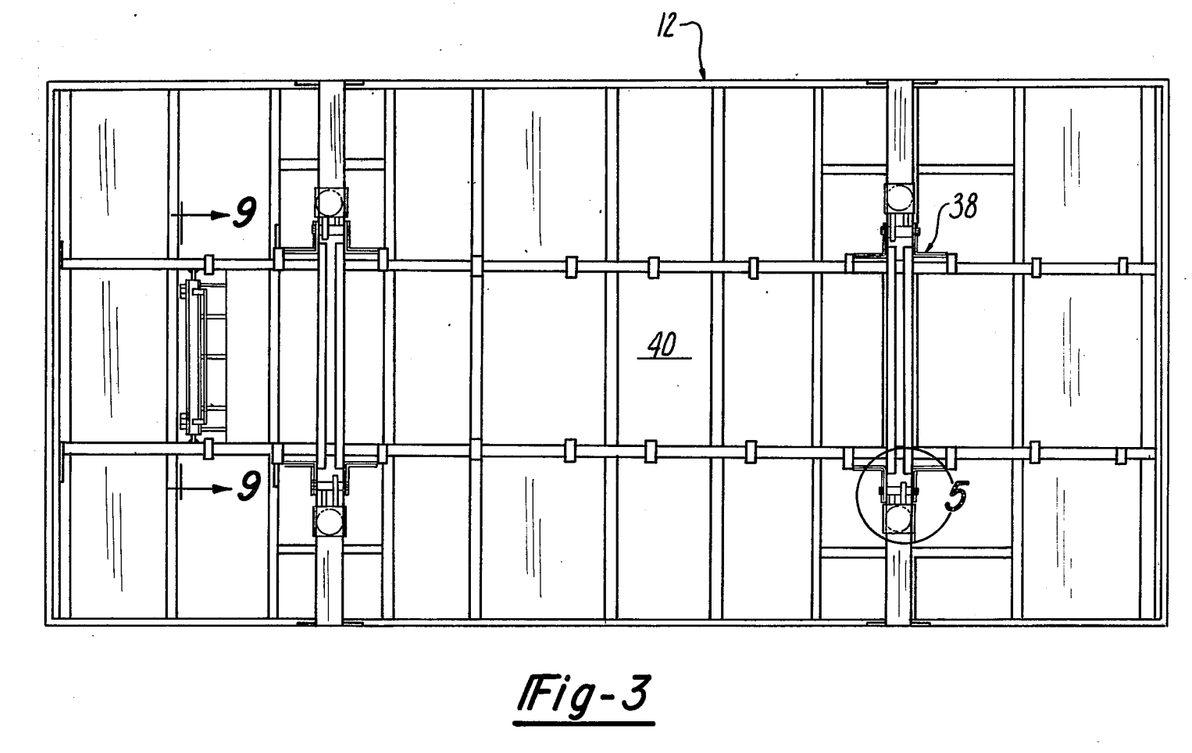
FIG. 3 is a bottom plan view of the truck body taken substantially along line 3—3 of FIG. 2.

Referring now to FIGS. 2 – 4, four guide members 38 are secured to the bottom surface 40 of the truck body 12 so that the guide members 38 extend downwardly toward the adapter frame 18. Each guide member 38 further comprises first and second gusset plates 42 and 44 wherein each gusset plate includes a lateral leg 46 and a longitudinal leg 48. The gusset plates 42 and 44 are secured to the truck body 12 so that the lateral legs 46 of the gusset plates 42 and 44 are in a parallel and spaced relationship while the longitudinal legs 48 of the gusset plates 42 and 44 lie substantially in the same plane. The gusset plates 42 and 44 are positioned on the truck body 12 so that as the truck body 12 is lowered onto the adapter frame 18, the stub portion 24 is received between the lateral legs 46 of the gusset plates 42 and 44 while the longitudinal legs 48 of the gusset plates 42 and 44 abut against the outside surface of the longitudinal frame members 20. Thus as the truck body 12 is lowered onto the adapter frame 18, the truck body 12 is guided to its correct longitudinal position on the adapter frame 18 by the lateral legs 46 of the gusset plates 42 and 44 while the longitudinal legs 48 of the gusset plates 42 and 46 laterally position the truck body 12 on the adapter frame 18. To aid in guiding the truck body 12 onto the adapter frame 18, preferably the downwardly extending edges of the gussets plates 42 and 44 are tapered to permit and correct for misalignment of body 12 with the adapter frame 18.

Referring now to FIGS. 5 – 8, latch means 50 are associated with each guide member 38 to lock the truck body 12 onto the adapter frame 18 when the truck body 12 reaches its lowermost position. The latch means 50 further comprises a latch member 52 pivotally mounted by a pin 54 to the truck body 12 and may, for example, be secured to the gusset plate 42 or 44. Each latch member 52 includes a weighted lever 56 spaced from the pivot pin 54 and a downwardly extending hook 58 having a lower tapered edge 60. The weighted lever 56 serves to maintain the latch 52 in the position shown in solid line in FIG. 7 so that as the truck body 12 is lowered onto the adapter frame 18, the tapered edge 60 of the hook 58 abuts against a latch bar 64 in the adapter frame 18 which may be reinforced by a bar 62. As the truck body 12 is further lowered, as shown in phantom line in FIGS. 7 and 8, the abutment of the hook tapered edge 60 with the latch bar 64 rotates the latch member 52 in a clockwise rotation around the pin 54 so that the hook 58 passes by the latch bar 64. As the hook portion 58 of the latch 52 passes underneath the latch bar 64, the weight of the lever 56 rotates the hook 58 in a counter clockwise direction to the position shown in solid line (FIGS. 7 and 8) so that the hook 58 engages the latch bar 64 and prevents upward movement of the truck body 12 from the adapter frame 18. In this manner, the latch means 50 automatically locks and secures the truck body 12 onto the adapter frame 18 as the truck body 12 is lowered to its lowermost position on the adapter frame 18 and thereafter prevents unintended detachment of the truck body 12 from the adapter frame 18.

Each weighted lever 56 of each latch member 52 is disposed directly above one of the actuators 28. Consequently, upon actuation of the actuators 28, the pistons 30 abut against the respective weighted lever 56 and rotate the latch member 52 in a clockwise direction (FIG. 7) thereby unlatching the hook members 58 from the latch bar 64. The actuators 28 not only unlock the latch means 50 to permit removal of the truck body 12 from the adapter frame 18 but also further extension of the pistons 30 raises the truck body 12 upwardly off from the adapter frame 18. The actuators 28 may also be used to lower the truck body 12 onto the adapter frame 18. For this reason, each piston 30 preferably includes a centering pin 100 (FIG. 7) which is received within a receiving chamber 102 formed in the weighted lever 56 to properly position the truck body 12 onto the adapter frame 18.

Figure 10:
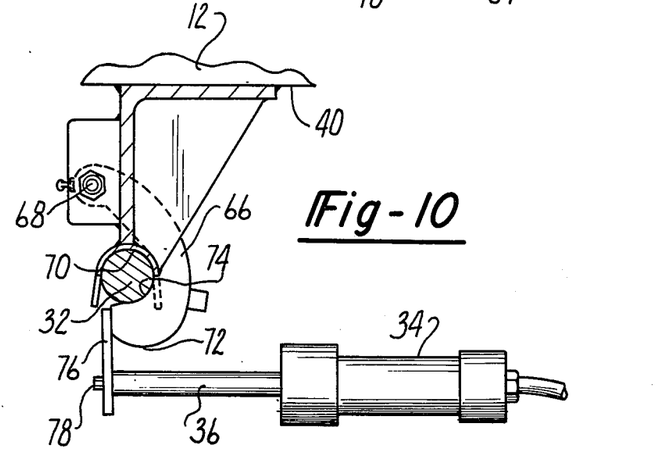
FIG. 10 is a plan view showing the hook members of the present invention in a first position and taken substantially along line 10—10 in FIG. 9.

Referring now to FIGS. 3 and 9 – 11, a pair of spaced and parallel hook members 66 are pivotally secured by pins 68 to the bottom surface 40 of the truck body 12 so that the hook members 66 extend downwardly from the body 12. A laterally elongated bearing member 69 having an elongated semi-cylindrical abutment surface 70 is secured to the truck body 12 between the hook members 66 and both the semi-cylindrical abutment surface 70 and the hook members 66 are positioned on the truck body 12 so that as the truck body 12 is lowered onto the adapter frame 18, the hinge tube 32 on the adapter frame 18 is received in the channel formed by the abutment surface 70. In a manner similar to the latch means 50, the lower edge 72 of the hook members 66 is curvilinear so that as the truck body 12 is lowered onto the adapter frame 18, the curvilinear surface 72 will cam the hook 66 away from the hinge tube 32 upon abutment with the hinge tube 32 to permit the hinge tube 32 to be received within the channel formed by the elongated semi-cylindrical abutment surface 70. With the truck body 12 in its lowermost position, as shown in FIG. 10, the hook members 66 hook underneath the hinge tube 32 so that the inner surface 74 of each hook member 66 abuts against the hinge tube 32.

The pivotal axis 68 of the hook members 66 is longitudinally offset from the hinge tube 32 and the surface 74 of the hook member 66 acts as a cam so that a load from the hinge tube 32 to the hooked members 66 increases the locking engagement of the hooked members 66 around the hinge tube 32. Thus the hinge tube 32 is securely entrapped between the bearing member 69 and the hook members 66 so that the truck body 12 may be pivoted around the hinge tube 32 while simultaneously insuring a secure pivotal connection between the hinge tube 32 and the truck body 12. Any conventional means may be utilized to effect pivotal action of the truck body 12 around the hinge tube 32 such as a hydraulic piston 77 (Fig. 1) which abuts against the bottom surface 40 of the truck body 12.

Figure 11:
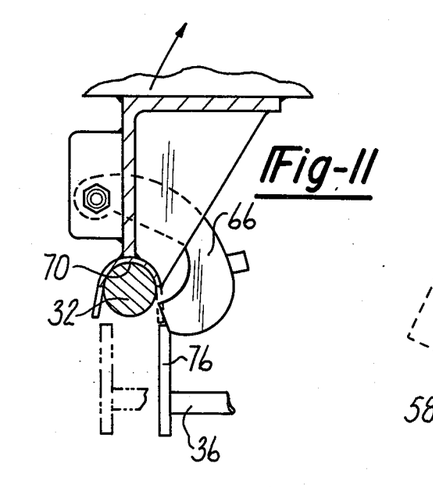
FIG. 11 is a plan view similar to FIG. 10 but showing the hook members in a second position.

As best shown in FIGS. 10 and 11, the actuator 34 with its piston 36 functions to disconnect the hook members 66 from the hinge tube 32. More specifically, an engagement plate 76 is secured to the outwardly extending axial end of the piston 36 by any conventional means, such as a bolt 78. The engagement plate 76 is adjacent the end of the hook members 66 so that retraction of the piston members 36 within the actuators 34 rotates the hook members 66 away from the hinge tube 32 to permit removal of the truck body 12 from the adapter frame 18. As has been previously mentioned, the actuators 34 are secured to the longitudinal frame members 20 of the frame adapter 18.

Although the operation of the system of the present invention should by now be apparent, the operation of the present invention will be briefly summarized in the interest of clarity. As the truck body 12 is lowered onto the adapter frame 18, the guide members 38 on the truck body 12 entrap the stub portions 24 of the frame cross members 22 to properly guide the truck body 12 in its descent onto the adapter frame 18. As the truck body 12 approaches its lowermost position, the latch means 50 automatically locks the truck body 12 onto the adapter frame 18 thus preventing unintended detachment of the truck body 12 from the adapter frame 18. Simultaneously, the adapter frame hinge tube 32 is received within the channel formed by the semicylindrical abutment surface 70 of the bearing member 69 and the hook members 56 wrap around the hinge tube 32 to thereby insure a secure pivotal connection between the hinge tube 32 and the truck body 12.

When pivotal or dumping action of the truck body 12 is desired, the actuators 28 are actuated thus unlocking the latch members 52 from the latch bar 64. The hydraulic cylinder 77 is then extended to effect the pivotal action of the truck body 12 around the hinge tube 32. With the actuator pistons retracted the latch members 52 again automatically latch the truck body 12 to the adapter frame 18 when the truck body 12 is returned to its normal or level position.

When detachment of the truck body 12 from the truck bed 14 is desired, actuators 34 and 28 are both actuated. The actuators 28 unlock the latch members 52 while the actuators 34 move the hook members 66 to a non-operable position. The truck body 12 is then vertically lifted off from the adapter.

Figure 12:
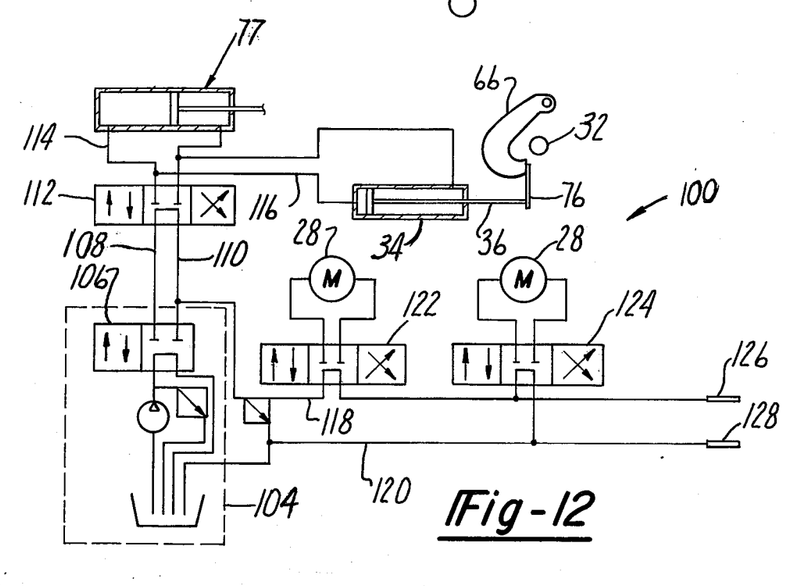
FIG. 12 is an exemplary hydraulic system for use with the truck system of the present invention.

An exemplary hydraulic system 100 for the present invention is illustrated in FIG. 12 and comprises a hydraulic pump 104 supplying hydraulic pressure through a valve 106 to hydraulic lines 108 and 110. The hydraulic lines 108 and 110 are in turn coupled to a normally closed valve 112 and the valve 112 is operable so that in a first or dump position, the valve 112 supplies hydraulic pressure to lines 114 and 116. The hydraulic pressure line 114 extends the dump cylinder 77 while the hydraulic pressure from line 116 extends the rods 36 of the second actuators 34 thus permitting the hooks 66 to couple around the hinge tube 32. Also, as should be apparent from FIG. 12, with the valve 112 in its second position, the valve 112 exhausts hydraulic fluid from both the dump cylinder 77 and the second actuators 34 which retracts the dump cylinder 77 and the rods 36 of the second actuators 34 thereby unhooking the hook members 66 from the hinge tube 32. However, if desired, a still further hydraulic valve may be coupled between the second actuators 34 and the valve 112 so that the second actuators 34 may be actuated independently of the dump cylinder 77. With the latter arrangement, the hook members 66 would engage around the hinge tube 32 even with the truck body 12 in its lowermost position.

The first actuators 28 are also coupled to the pump 104 by hydraulic lines 118 and 120 and through hydraulic valves 122 and 124. The valve 122, for example, may control the extension and retraction of the front actuators 28 while conversely the hydraulic valve 124 may control the extension or retraction of the rear first actuators 28. In addition, hydraulic connectors 126 and 128 are preferably coupled to the lines 118 and 120 for connection to accessory hydraulic equipment.

In operation the valve 106 is actuated during the dump and lifting operations. With the valve 106 in its actuated position, actuation of the hydraulic valve 112 to its first position simultaneously causes the extension of the dump cylinder 26 and also extends the rods 36 of the second actuator 34 thus permitting the hooks 66 to engage the hinge tube 32.

Similarly, with the valve 106 in its actuated position, actuation of the valves 122 and 124 will cause the extension of the pistons for the first actuators 28 thereby raising the truck body 12 while simultaneously unlocking the latch members as has been previously described.

It can thus be seen, that the system of the present invention provides a means whereby a truck body may be both pivotally and detachably coupled to an adapter frame secured to the bed of a truck which is not only relatively simple, but also inexpensive, in construction. Moreover, the latch means 50 automatically lock the truck body to the truck bed when the truck body reaches its lowermost position thus preventing unintended detachment of the truck body from the truck bed. Moreover, unlike the previously known detachable and pivotal truck bodies, the adapter frame 18 of the present invention is rigidly secured to the truck bed, rather than pivotally mounted, thus eliminating much of the previously known complexity and cost.

Having thus described our invention, many modifications thereto will become apparent to those skilled in the art to which it pertains without deviation from the spirit of the invention as defined by the scope of the appended claims.

What is claimed is:

1. A system for detachably securing a truck body onto the bed of the truck as said body is lowered onto said bed, said system comprising:

guide means secured to the bottom surface of the truck body, an adapter frame secured to the bed of said truck, and adapted to receive and guide said guide means as said truck body is lowered onto said truck bed, means for locking said truck body onto said adapter frame when said truck body is in its lowermost position, and means for selectively unlocking said truck body from said adapter frame, said adapter frame comprising two spaced and parallel longitudinal frame members and two spaced and parallel transfer cross members, each axial end of said cross members extending laterally outwardly from one of said longitudinal frame members and, said guide means further comprising a pair of gusset plates operatively associated with each axial end of each cross member wherein said gusset plates includes a longitudinal leg which abuts against the outside surface of said longitudinal frame member and a lateral leg which abuts against the outwardly extending axial end of said cross member.

2. The system as defined in claim 1, wherein said means for locking said truck body onto said adapter frame further comprises at least one latch pivotally mounted to said truck body wherein said latch operatively engages a latch bar on said adapter frame as said truck body is lowered to its lowermost position.

3. The system as defined in claim 2, wherein at least one of said latches is pivotally mounted to one of said guide memebers.

4. The system as defined in claim 2, wherein said means for unlocking said truck body further comprises an actuator associated with said latches, said actuator being secured to said adapter frame and operable upon actuation to move said latch away from said latch bar to an inoperable position.

5. A system for detachably securing a truck body onto the bed of a truck as said body is lowered onto said bed, said system comprising:

guide means secured to the bottom surface of said truck body, an adapter frame secured to said bed of said truck, and adapted to receive and guide said guide means as said truck body is lowered onto said truck bed, means for locking said truck body onto said adapter frame when said truck body is in its lowermost position, means for selectively unlocking said truck body from said adapter frame, a hinge member laterally secured across the rear end of said adapter frame, a bearing member secured to said truck body and abutting against said hinge member when said truck body is in its lowermost position, said bearing member including an elongated semicylindrical abutment surface which abuts against said hinge member, and means for securing said bearing member to said hinge member comprising a downwardly extending hook member pivotally secured to said truck body at each axial end of said bearing member, said hook member operatively engaging around said hinge member as said truck body reaches it lowermost position.

6. The invention as defined in claim 5, and including means for selectively moving said hook members to an inoperable position.

7. The invention as defined in claim 6, wherein said means for moving said hook members comprises an actuator associated with each hook member, wherein one of said actuators is secured to each of said longitudinal frame members.

8. A system for detachably securing a truck body onto the bed of the truck as said body is lowered onto said bed, said system comprising:

guide means secured to the bottom surface of the truck body, said truck having a bed and means formed on said bed for receiving and guiding said guide means as said truck body is lowered onto said truck bed, means for locking said truck body onto said bed when said truck body is in its lowermost position, and means for selectively unlocking said truck body from said bed, said means formed on said bed comprising two spaced and parallel longitudinal frame members and two spaced and parallel transfer cross members, each axial end of said cross members extending laterally outwardly from one of said longitudinal frame members and, said guide means further comprising a pair of gusset plates operatively associated with each axial end of each cross member wherein each of said gusset plates includes a longitudinal leg which abuts against the outside surface of said longitudinal frame member and a lateral leg which abuts against the outwardly extending axial end of said cross member.

9. A system for detachably securing a truck body onto the bed of a truck as said body is lowered onto said bed, said system comprising:

guide means secured to the bottom surface of said truck body, said truck having a bed and means formed on said bed adapted to receive and guide said guide means as said truck body is lowered onto said truck bed, means for locking said truck body onto said bed when said truck body is in its lowermost position, means for selectively unlocking said truck body from said bed, a hinge member laterally secured across the rear end of said bed, a bearing member secured to said truck body and adapted to abut against said hinge member when said truck body is in its lowermost position, said bearing member including an elongated semicylindrical abutment surface which abuts against said hinge member, and means for securing said bearing member to said hinge member comprising a downwardly extending hook member pivotally secured to said truck body at each axial end of said bearing member whereby said hook member operatively engages around said hinge member as said truck body reaches its lowermost position.

10. A truck body and means for detachably mounting said truck body onto the bed of a truck, said means comprising:
- latch means mounted to said truck body and automatically operable to lock said truck body to the bed of said truck when said truck body is lowered onto the bed of said truck, and
- actuator means mounted to the bed of said truck and operable upon actuation to move said latch means to an unlocked position whereby said truck body can be separated from the bed of said truck,
- said actuator means including a cylinder having a rod movable upon extension into engagement with said latch means to unlock said latch means, further extension of said rod producing engagement with said truck body to lift said truck body upwardly away from the bed of said truck.

11. The invention as defined in claim 10 and including a hinge member mounted to the bed of said truck, a bearing member carried by said truck body and hingedly engaging said hinge member when said truck body is lowered unto the bed of said truck and second latch means mounted to said truck body and automatically operable to hingedly lock said bearing member to said hinge member when said truck body is lowered onto the bed of said truck.

12. The invention as defined in claim 11 and including second actuator means mounted to the bed of said truck and operable upon actuation to move said second latch means to an unlocked position to permit separation of said truck body and the bed of said truck.

13. A truck body and means for detachably mounting said truck body onto the bed of a truck, said means comprising:
- latch means mounted to said truck body and automatically operable to lock said truck body to the bed of said truck when said truck body is lowered onto the bed of said truck,
- first actuator means mounted to the bed of said truck and operable upon actuation to move said latch means to an unlocked position whereby said truck body can be separated from the bed of said truck,
- a hinge means having a first portion mounted to the bed of said truck and a second portion carried by said truck body, said first and second portions hingedly mating when said truck body is lowered unto the bed of said truck,
- second latch means mounted to said truck body and automatically operable to hingedly lock said first and second members together when said truck body is lowered onto the bed of said truck and
- second actuator means mounted to the bed of said truck and operable upon actuation to move said second latch means to an unlocked position and
- third actuating means mounted to the bed of said truck and engageable with said truck body to, upon actuation, pivot said truck body about said hinge means,
- whereby upon actuation of said first and third actuating means said truck body will be pivoted with respect to the bed of said truck and upon actuation of said first and second actuating means said truck body will be disengaged from the bed of said truck to permit separation of said truck body from said truck.

* * * * *

UNITED STATES PATENT AND TRADEMARK OFFICE
CERTIFICATE OF CORRECTION

PATENT NO. : 4,071,274

DATED : January 31, 1978

INVENTOR(S) : Thomas B. Dalton et al

It is certified that error appears in the above-identified patent and that said Letters Patent are hereby corrected as shown below:

Col. 3, line 39, after "hinge", insert --tube--.

Col. 5, line 59, delete "56", insert --66--.

Col. 7, line 40, delete "memebers", insert --members--.

Signed and Sealed this

Twenty-third Day of May 1978

[SEAL]

Attest:

RUTH C. MASON
Attesting Officer

LUTRELLE F. PARKER
Acting Commissioner of Patents and Trademarks